(12) United States Patent
Maruyama et al.

(10) Patent No.: US 9,822,579 B2
(45) Date of Patent: Nov. 21, 2017

(54) VEHICLE DOOR STRUCTURE

(71) Applicant: KABUSHIKI KAISHA TOYOTA JIDOSHOKKI, Aichi (JP)

(72) Inventors: Katsuya Maruyama, Aichi (JP); Hiroshi Kuno, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 98 days.

(21) Appl. No.: 15/074,155

(22) Filed: Mar. 18, 2016

(65) Prior Publication Data

US 2016/0273262 A1 Sep. 22, 2016

(30) Foreign Application Priority Data

Mar. 19, 2015 (JP) ................. 2015-056773

(51) Int. Cl.
*E06B 3/50* (2006.01)
*B60J 5/04* (2006.01)
*E05D 15/06* (2006.01)
*E05B 81/72* (2014.01)
*E05B 79/10* (2014.01)
*B60J 5/06* (2006.01)

(52) U.S. Cl.
CPC ............... *E06B 3/509* (2013.01); *B60J 5/047* (2013.01); *B60J 5/0486* (2013.01); *B60J 5/06* (2013.01); *E05B 79/10* (2013.01); *E05B 81/72* (2013.01); *E05D 15/0604* (2013.01); *E05Y 2900/531* (2013.01)

(58) Field of Classification Search
CPC .. B60J 5/047; B60J 5/0486; B60J 5/06; E05B 79/10; E05B 81/72; E05B 83/36; E05B 83/40; E05C 7/04; E05D 15/0604; E05D 15/58; E05Y 2900/531; E06B 3/509
See application file for complete search history.

(56) References Cited

U.S. PATENT DOCUMENTS 4,502,246 A * 3/1985 Minami ................. E05C 17/50
49/213
6,108,989 A * 8/2000 Kordes ................. E04B 2/827
160/225

(Continued)

FOREIGN PATENT DOCUMENTS

DE 19702698 A1 * 10/1997 ............. E05B 81/14
FR 2818591 A1 * 6/2002 ............. B60J 5/105

(Continued)

*Primary Examiner* — Glenn Dayoan
*Assistant Examiner* — Paul Chenevert
(74) *Attorney, Agent, or Firm* — Greenblum & Bernstein, P.L.C.

(57) ABSTRACT

A vehicle door structure includes a door lock unit configured to lock a sliding door and a swing door when the sliding door is in a fully opened state, and a lock detection unit configured to detect a locked state between the sliding door and the swing door by the door lock unit. The door lock unit has a locking pin disposed at a guide body, a locking pin biasing member configured to bias the locking pin toward the swing door, and a fitting section formed at a slide rail and fitted onto the locking pin. The lock detection unit detects the locked state between the sliding door and the swing door by detecting the locking pin being fitted into the fitting section.

5 Claims, 8 Drawing Sheets (56) References Cited

U.S. PATENT DOCUMENTS

| | | | | |
|---|---|---|---|---|
| 7,422,268 B2* | 9/2008 | Kothe | ............... | B60J 5/06 |
| | | | | 292/DIG. 23 |
| 7,469,943 B2* | 12/2008 | Hiramoto | ............... | E05B 81/06 |
| | | | | 292/201 |
| 7,472,944 B2* | 1/2009 | Miyagawa | ............... | B60J 5/06 |
| | | | | 296/155 |
| 8,925,248 B2* | 1/2015 | Maruyama | ............... | B60J 5/047 |
| | | | | 296/146.11 |
| 9,718,331 B2* | 8/2017 | Maruyama | ............... | B60J 5/047 |
| 9,731,583 B2* | 8/2017 | Maruyama | ............... | B60J 5/047 |
| 2006/0059783 A1* | 3/2006 | Braun | ............... | E05B 65/0835 |
| | | | | 49/360 |
| 2006/0197357 A1* | 9/2006 | Catania | ............... | B60J 5/06 |
| | | | | 296/155 |
| 2012/0167468 A1 | 7/2012 | Hozumi et al. | | |
| 2014/0046551 A1 | 2/2014 | Ojima et al. | | |
| 2016/0114659 A1* | 4/2016 | Maruyama | ............... | E05D 15/101 |
| | | | | 49/164 |
| 2016/0340938 A1* | 11/2016 | Chiba | ............... | E05B 77/22 |
| 2017/0081885 A1* | 3/2017 | Yun | ............... | E05F 15/40 |

FOREIGN PATENT DOCUMENTS

| | | | | |
|---|---|---|---|---|
| GB | 156361 A * | 1/1921 | ............... | E06B 3/50 |
| JP | 2011-46271 | 3/2011 | | |
| JP | 2013189186 A * | 9/2013 | ............... | B60J 5/105 |
| JP | 2014-37163 | 2/2014 | | |
| JP | 2015086522 A * | 5/2015 | ............... | E05B 81/20 |
| JP | WO 2016021421 A1 * | 2/2016 | ............... | B60J 5/00 |

* cited by examiner

VEHICLE DOOR STRUCTURE

CROSS-REFERENCE TO RELATED APPLICATION

This application is based upon and claims the benefit of priority from Japanese Patent Application No. 2015-056773, filed on Mar. 19, 2015, the entire contents of which are incorporated herein by reference.

BACKGROUND OF THE INVENTION

Field of the Invention

The present disclosure relates to a vehicle door structure.

Related Background Art

As a vehicle door structure of the related art, for example, a technology disclosed in Patent Literature 1 (Japanese Unexamined Patent Publication No. 2014-37163) is known. The vehicle door structure disclosed in Patent Literature 1 includes a sliding door configured to open and close a front region of a rear door opening section, and a swing door configured to open and close a rear region of the rear door opening section together with the sliding door. The sliding door is slid forward and rearward with respect to a vehicle body by a slide support mechanism. The swing door is pivoted with the sliding door via a hinge mechanism in a state in which the sliding door is fully opened to overlap the swing door. In addition, the vehicle door structure includes a door panel lock mechanism configured to lock the sliding door and the swing door when the sliding door is opened to a predetermined degree of opening (a fully opened position), a degree of opening detection mechanism configured to estimate the state in which the sliding door and the swing door are locked by the door panel lock mechanism by detecting that the sliding door is opened at the predetermined degree of opening, and a handle disable mechanism configured to disable the manipulation of a swing door handle when the swing door is in a fully closed state. The degree of opening detection mechanism has a guide body installed at a rear end portion of the sliding door and constituting a portion of the slide support mechanism, an engaging lever swingably attached to the swing door and engaged with a shaft section of the guide body, and a connecting member configured to connect the engaging lever and the handle disable mechanism. The handle disable mechanism enables the manipulation of the swing door handle when it is detected by a degree of opening detection mechanism that the sliding door and the swing door are in a locked state.

SUMMARY OF THE INVENTION

In the vehicle door structure of the related art, when a shaft section (a part for detection) of a guide body attached to the sliding door abuts an engaging lever and pushes the engaging lever thereinto, it is detected that the sliding door is opened to a predetermined degree of opening and the sliding door and the swing door are in a locked state. Accordingly, in order to prevent the sliding door from being rattled and the sliding door from moving with respect to the swing door during pivotal movement of the swing door, the part for detection should push the engaging lever thereinto at which the sliding door and the swing door are securely locked. For this reason, position adjustment of the engaging lever is time-consuming.

The present disclosure is directed to provide a vehicle door structure capable of reliably detecting a locked state beteen the sliding door and the swing door without the need of performing precise position adjustment of parts.

The present disclosure provides a vehicle door structure including a sliding door and a swing door that are configured to open and close a door opening section formed at a vehicle body, the vehicle door structure including: a sliding door support unit configured to support the sliding door to enable opening and closing thereof; a swing door handle configured to perform an operation of opening the swing door; a door lock unit configured to lock the sliding door and the swing door when the sliding door is in a fully opened state; a manipulation control unit configured to disable the manipulation of the swing door handle when the swing door is in a fully closed state; and a lock detection unit configured to detect a locked state between the sliding door and the swing door by the door lock unit, wherein the sliding door support unit has a slide rail attached to the swing door and configured to slide the sliding door with respect to the swing door, and a guide body attached to the sliding door and configured to guide the sliding door to the slide rail upon sliding of the sliding door, the door lock unit has a locking pin disposed at the guide body, a locking pin biasing member configured to bias the locking pin toward the swing door, and a fitting section formed at the slide rail and fitted onto the locking pin, and locks the sliding door and the swing door by fitting the locking pin into the fitting section, the lock detection unit detects the locked state between the sliding door and the swing door by detecting the locking pin being fitted into the fitting section, and the manipulation control unit enables a manipulation of the swing door handle when the locked state between the sliding door and the swing door is detected by the lock detection unit.

In the above-mentioned vehicle door structure of the present disclosure, when the sliding door is in the fully opened state, as the locking pin is biased toward the swing door to be fitted into the fitting section by the locking pin biasing member, the sliding door and the swing door are in the locked state. Here, when the swing door is fully closed, even though the sliding door is opened, since the manipulation of the swing door handle is overrode when the locked state between the sliding door and the swing door is not detected, the swing door is not opened even when the swing door handle is manipulated. Meanwhile, when the swing door is fully closed, even though the sliding door is in the fully opened state and the locked state between the sliding door and the swing door is detected, since the manipulation of the swing door handle is enabled, the swing door can be opened as the swing door handle is manipulated. Accordingly, the swing door can be prevented from being opened in a state in which the sliding door and the swing door are not locked. Here, as it is detected that the locking pin is fitted into the fitting section at a fully opened position of the sliding door, the locked state between the sliding door and the swing door is detected. Accordingly, the locked state between the sliding door and the swing door can be reliably detected without the need of performing fine position adjustment of the part.

The fitting section may have a cylindrical shape, the lock detection unit may have a lever pivotally attached to the swing door via a pivotal shaft and configured to engage with a front end portion of the locking pin fitted into the fitting section, a lever-biasing member configured to bias a portion of the lever engaged with the locking pin toward the fitting section, and a connecting member configured to connect a portion of the lever opposite to the portion engaged with the locking pin with respect to the pivotal shaft and the manipulation control unit, and the locked state between the sliding door and the swing door may be detected by pressing the lever by the locking pin.

In this case, when the sliding door is in the fully opened state and the locking pin is biased toward the fitting section to be fitted into the fitting section by the locking pin biasing member, as the front end portion of the locking pin presses the lever, the locked state between the sliding door and the swing door is detected. Accordingly, the locked state between the sliding door and the swing door can be simply detected without the use of a sensor or the like serving as the lock detection unit.

The lever may be disposed to close an opening of the fitting section by a biasing force of the lever-biasing member in a state in which the front end portion of the locking pin is not engaged with the lever.

In this case, when the sliding door is not in the fully opened state, i.e., in a state in which the locking pin is not fitted into the fitting section, since the opening of the fitting section is closed by the lever, water can be prevented from entering a vehicle body through the fitting section.

The lever may have an L-shaped cross section, and the connecting member may be connected to the lever to extend toward a side at which the sliding door is closed.

In this case, for example, when the manipulation control unit is disposed at an end portion of the swing door close to a side at which the sliding door is closed, the connecting member may not be bent at the side at which the sliding door is closed.

According to the present disclosure, the vehicle door structure capable of reliably detecting the locked state between the sliding door and the swing door without the need of performing fine position adjustment of the part can be provided.

DESCRIPTION OF THE PREFERRED EMBODIMENTS

Hereinafter, an embodiment of the present disclosure will be described in detail with reference to the accompanying drawings. Further, in the drawings, the same or equivalent elements are designated by the same reference numerals and overlapping description thereof will be omitted.

Figure 1:
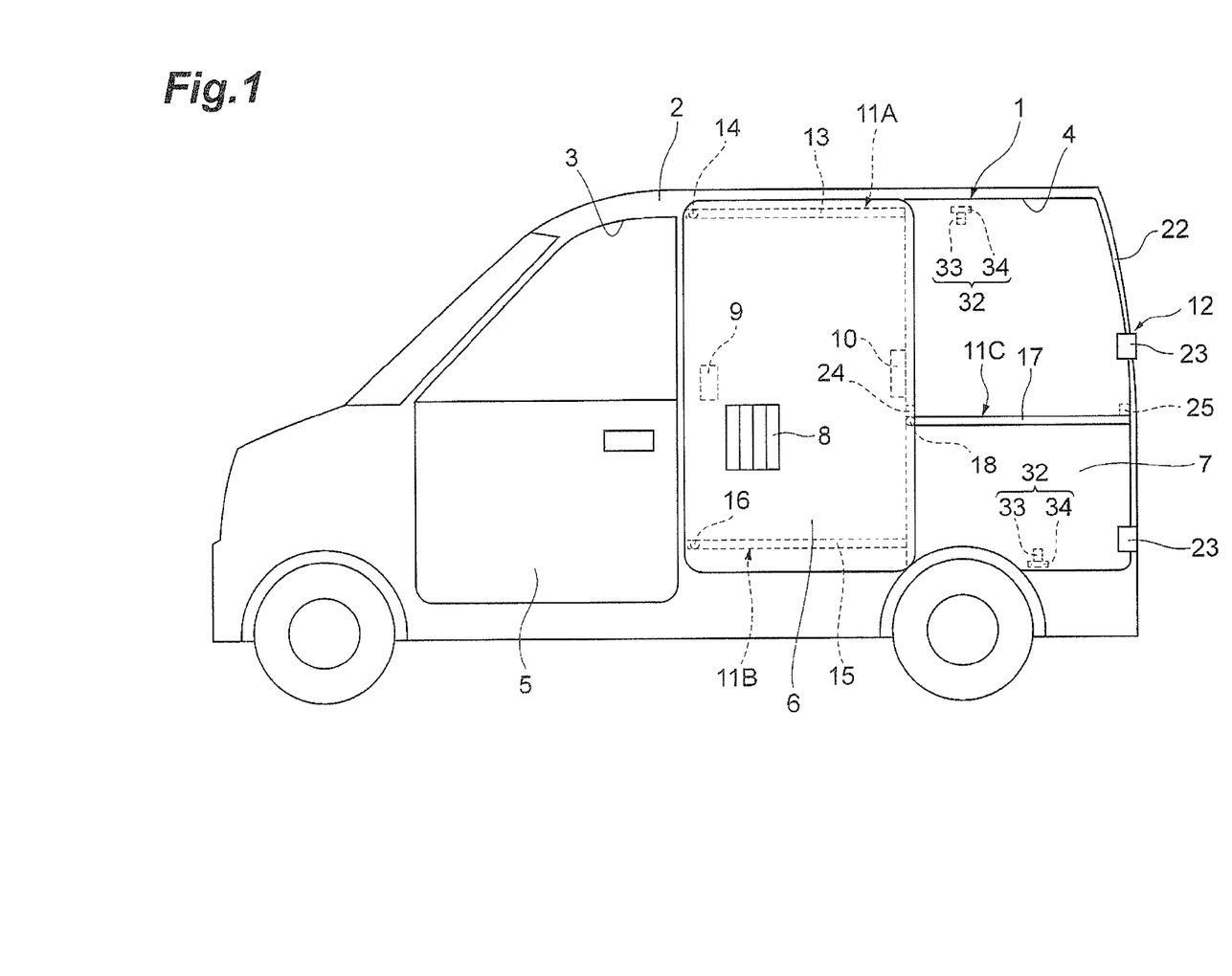
FIG. 1 is a side view showing a vehicle including an embodiment of a vehicle door structure according to the present disclosure.

FIG. 1 is a side view showing a vehicle including an embodiment of a vehicle door structure according to the present disclosure. In FIG. 1, a vehicle door structure 1 of the embodiment is applied to a side portion of a vehicle body 2. A front door opening section 3 disposed at a side of a front seat and a rear door opening section 4 disposed at a side of a cargo compartment disposed behind the front seat are formed at the side portion of the vehicle body 2. The front door opening section 3 is opened and closed by a front door 5.

Figure 2A:
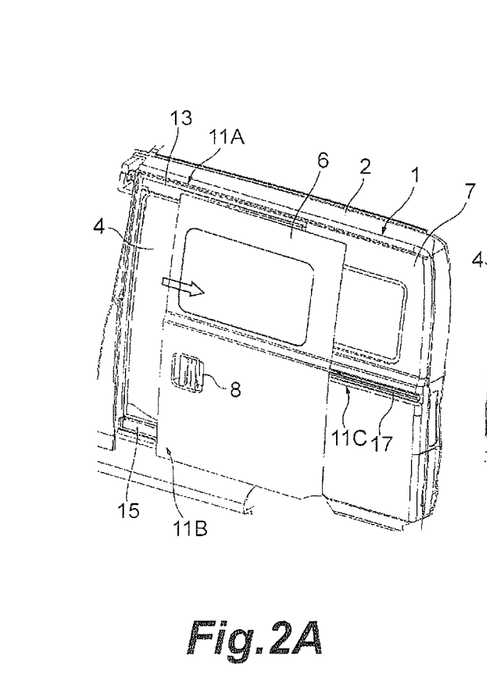
FIGS. 2A to 2C are perspective view showing an aspect in which a sliding door and a swing door shown in FIG. 1 are opened.
Figure 2B:
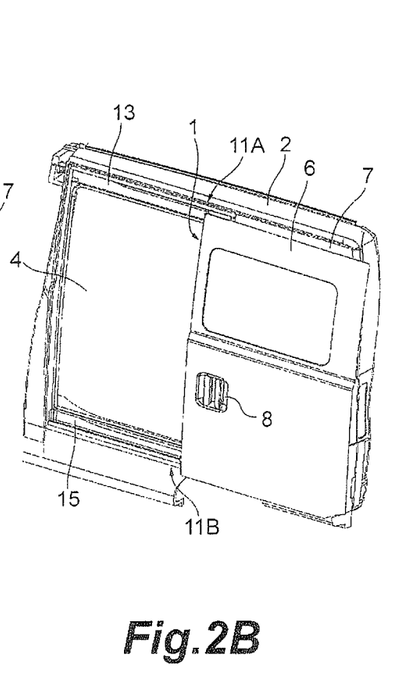

The rear door opening section 4 is opened and closed by a slide opening/closing type sliding door 6 and a swing opening/closing type swing door 7. As shown in FIGS. 2A and 2B, the sliding door 6 may slide (move) in the forward/rearward direction of the vehicle body 2 to open and close a front region (a first region) of the rear door opening section 4. The sliding door 6 is disposed outside the swing door 7 to overlap the swing door 7 when the sliding door 6 is in a fully opened state (see FIG. 2B).

Figure 2C:
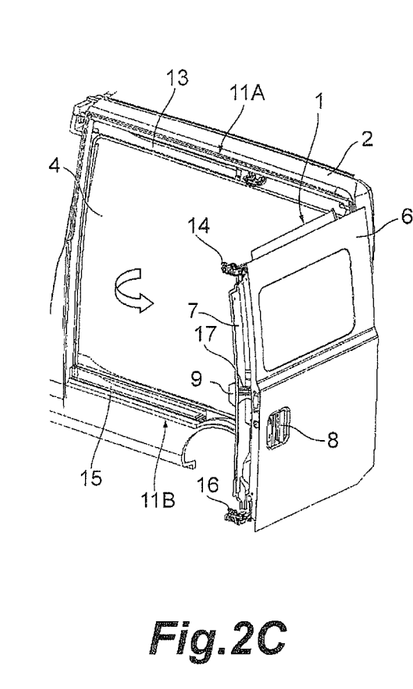

As shown in FIG. 2C, the swing door 7 may pivot with respect to the vehicle body 2 while being overlapped by the sliding door 6, and may open and close a rear region (a second region) of the rear door opening section 4 together with the sliding door 6.

A sliding door outer handle 8 is installed at an outer surface of the sliding door 6, and a sliding door inner handle 9 is installed at an inner surface of the sliding door 6. The sliding door outer handle 8 and the sliding door inner handle 9 are handles configured to perform an opening/closing operation of the sliding door 6. A swing door handle 10 configured to perform an opening operation of the swing door 7 is installed at a front end portion of the swing door 7.

The vehicle door structure 1 includes sliding door support units 11A to 11C configured to support the sliding door 6 to slide (open/close) in a forward/rearward direction of the vehicle body 2, and a swing door support unit 12 configured to support the swing door 7 to be pivoted (opened/closed) with respect to the vehicle body 2.

The sliding door support unit 11A has an upper slide rail 13 attached to an upper portion of the vehicle body 2 to extend in the forward/rearward direction (the opening/closing direction of the sliding door 6) of the vehicle body 2 and configured to slide the sliding door 6 with respect to the vehicle body 2, and a guide body 14 attached to a front end upper portion of the sliding door 6 and configured to guide the upper slide rail 13 upon sliding of the sliding door 6. The guide body 14 may be separated from the upper slide rail 13 to move in a vehicle width direction in a state in which the sliding door 6 is fully opened.

The sliding door support unit 11B has a lower slide rail 15 attached to a lower portion of the vehicle body 2 to extend in the forward/rearward direction of the vehicle body 2 and configured to slide the sliding door 6 with respect to the vehicle body 2, and a guide body 16 attached to a front end lower portion of the sliding door 6 and configured to guide the lower slide rail 15 upon sliding of the sliding door 6. The guide body 16 may be separated from the lower slide rail 15 to move in the vehicle width direction in a state in which the sliding door 6 is fully opened.

The sliding door support unit 11C has an intermediate slide rail 17 attached to the vicinity of a central portion of an outer surface of the swing door 7 and configured to slide the sliding door 6 with respect to the swing door 7, and a guide body 18 attached to a rear end portion of the sliding door 6 and configured to guide the intermediate slide rail 17 upon sliding of the sliding door 6.

Figure 3:
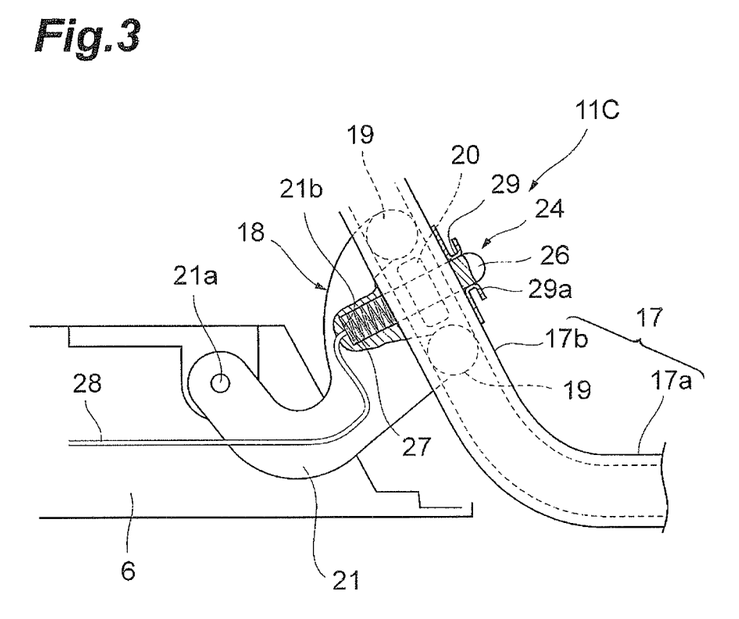
FIG. 3 is a plan view (including a partial cross-sectional view) showing one sliding door support unit and a full-closing door lock unit shown in FIG. 1.

As shown in FIG. 3, the intermediate slide rail 17 is constituted by a rail main body section 17a extending in the forward/rearward direction of the swing door 7 in the fully closed state of the swing door 7, and a rail curved section 17b disposed at a front end of the rail main body section 17a and curved to be inclined forward with respect to the rail main body section 17a from the rail main body section 17a toward the inside of the vehicle body 2.

As shown in FIG. 3, the guide body 18 has a pair of front and rear horizontal rollers 19 and a vertical roller 20 guided by the intermediate slide rail 17, and a support section 21 pivotally connected to the sliding door 6 via a shaft section 21a and configured to freely rotatably support the horizontal rollers 19 and the vertical roller 20. The vertical roller 20 is disposed between the pair of horizontal rollers 19.

Returning to FIG. 1, the swing door support unit 12 has a rear pillar 22 installed at a rear end portion of the vehicle body 2, and two upper and lower hinges 23 configured to pivotally connect the swing door 7 to the rear pillar 22.

In addition, the vehicle door structure 1 further includes a full-closing door lock unit 24 configured to lock the sliding door 6 and the swing door 7 when the sliding door 6 is in the fully closed state, and a full-opening door lock unit 25 configured to lock the sliding door 6 and the swing door 7 when the sliding door 6 is in the fully opened state.

As shown in FIG. 3, the full-closing door lock unit 24 has a locking pin 26 disposed at the guide body 18, a locking pin spring 27 (a locking pin biasing member) configured to bias the locking pin 26 toward the swing door 7, a lock-releasing cable 28 configured to connect the locking pin 26 to the sliding door outer handle 8 and the sliding door inner handle 9, and a fitting section 29 installed in the vicinity of the front end portion of the intermediate slide rail 17 and fitted onto the locking pin 26. One end of the lock-releasing cable 28 is connected to a base end surface of the locking pin 26.

The locking pin 26 has a columnar shape and is disposed to pass through the vertical roller 20. The locking pin spring 27 is accommodated in a spring accommodating concave section 21b formed in the support section 21. The locking pin spring 27 is disposed between a base end surface of the locking pin 26 and a bottom surface of the spring accommodating concave section 21b. Accordingly, the locking pin 26 is attached to the support section 21 via the locking pin spring 27.

The fitting section 29 is a member having a cylindrical shape, and attached to an inner sidewall section of the rail curved section 17b of the intermediate slide rail 17 by a bolt or welding. A flange 29a is formed at a front end side of the fitting section 29. A pin hole (not shown) passing through the locking pin 26 is formed at a position corresponding to the fitting section 29 in the inner sidewall section of the intermediate slide rail 17.

In the above-mentioned full-closing door lock unit 24, when the sliding door 6 is in the fully closed state, a position of the locking pin 26 coincides with a position of the fitting section 29. Then, a front end side portion of the locking pin 26 passes through a pin hole (not shown) to enter the fitting section 29 by a biasing force of the locking pin spring 27. Accordingly, as the locking pin 26 is fitted into the fitting section 29, the sliding door 6 and the swing door 7 are locked.

The release of the locking of the sliding door 6 and the swing door 7 is performed due to the opening operation of the sliding door 6 by the sliding door outer handle 8 or the sliding door inner handle 9. Specifically, when the operation of opening the sliding door 6 is performed by the sliding door outer handle 8 or the sliding door inner handle 9, the locking pin 26 is pulled against the biasing force of the locking pin spring 27 by the lock-releasing cable 28 and the front end side portion of the locking pin 26 exits from the fitting section 29. As a result, the locked state between the sliding door 6 and the swing door 7 is released.

Figure 4A:
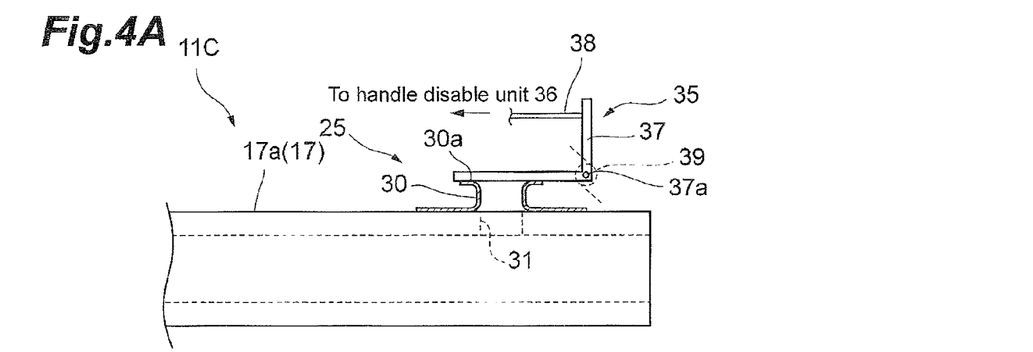
FIGS. 4A and 4B are plan view (including a partial cross-sectional view) showing one sliding door support unit, a full-opening door lock unit and a lock detection unit shown in FIG. 1.
Figure 4B:
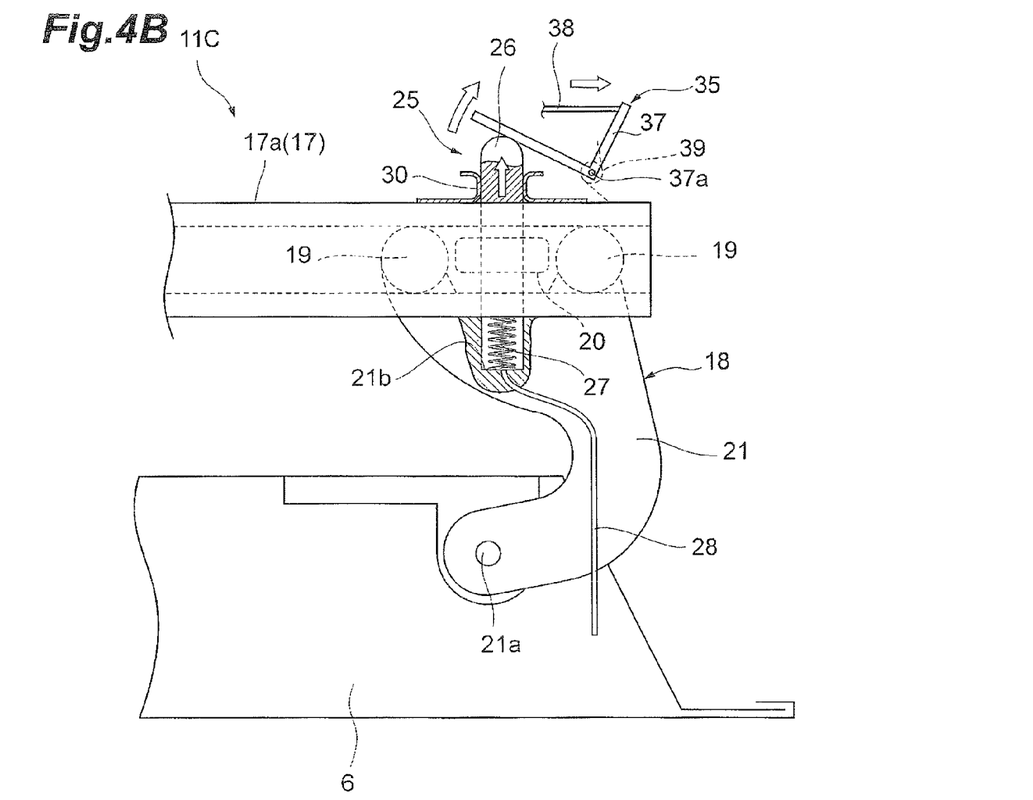

As shown in FIG. 4, the full-opening door lock unit 25 has the locking pin 26, the locking pin spring 27 and the lock-releasing cable 28, which are described above, and a fitting section 30 formed in the vicinity of the rear end portion of the intermediate slide rail 17 and fitted onto the locking pin 26. The locking pin 26, the locking pin spring 27 and the lock-releasing cable 28 are not only a partial configuration of the full-closing door lock unit 24 but also a partial configuration of the full-opening door lock unit 25.

The fitting section 30 is a member having a cylindrical shape, and attached to an inner sidewall section of the rail main body section 17a of the intermediate slide rail 17 by a bolt or welding. A flange 30a is formed at a front end side of the fitting section 30. A pin hole 31 through which the locking pin 26 passes is formed at a position corresponding to the fitting section 30 in the inner sidewall section of the intermediate slide rail 17.

In the above-mentioned full-opening door lock unit 25, when the sliding door 6 is in the fully opened state, as shown in FIG. 4B, a position of the locking pin 26 coincides with a position of the fitting section 30. Then, the front end side portion of the locking pin 26 passes through the pin hole 31 to enter the fitting section 30 by the biasing force of the locking pin spring 27. Accordingly, as the locking pin 26 is fitted into the fitting section 30, the sliding door 6 and the swing door 7 are in the locked state.

The release of the locking of the sliding door 6 and the swing door 7 is performed due to the operation of closing the sliding door 6 by the sliding door outer handle 8 or the sliding door inner handle 9. Specifically, when the operation of closing the sliding door 6 is performed by the sliding door outer handle 8 or the sliding door inner handle 9, the locking pin 26 is pulled against the biasing force of the locking pin spring 27 by the lock-releasing cable 28, and the front end side portion of the locking pin 26 exits the fitting section 30. As a result, the locked state between the sliding door 6 and the swing door 7 is released.

Returning to FIG. 1, the vehicle door structure 1 further includes two upper and lower swing door lock units 32 configured to lock the swing door 7 with respect to the vehicle body 2 when the swing door 7 is in the fully closed state. The swing door lock units 32 are constituted by latch type lock members 33 attached to upper and lower portions of the swing door 7, and strikers 34 attached to upper and lower portions of the vehicle body 2 and configured to engage with the lock members 33, respectively.

Figure 5:
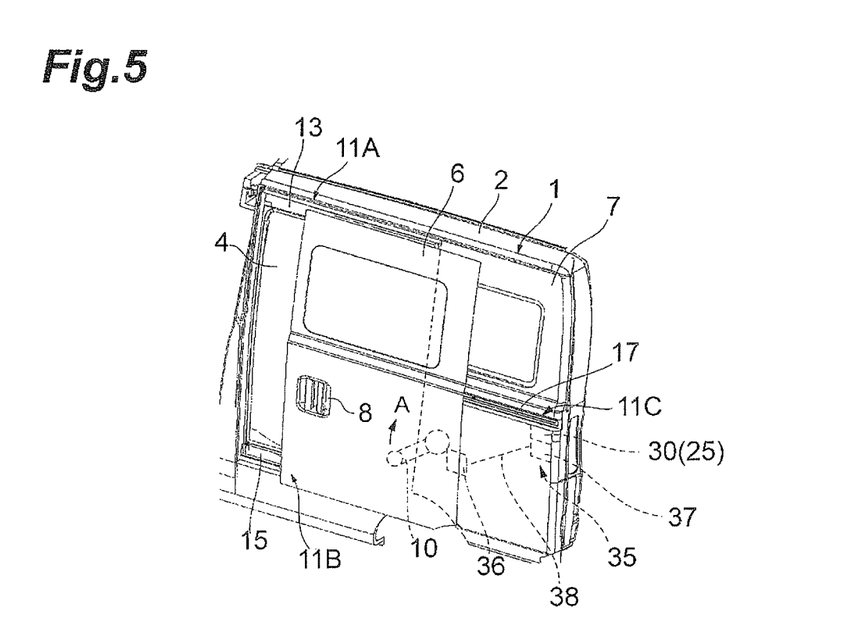
FIG. 5 is a perspective view showing a disposition place of a lock detection unit and a handle disable unit shown in FIG. 3.

When the swing door 7 is in the fully closed state, as the lock member 33 is moved toward the vehicle body 2 to engage with the striker 34 by a biasing force of a spring (not shown), the swing door 7 and the vehicle body 2 are in the locked state. The lock member 33 and the swing door handle 10 are connected by a cable (not shown). The release of the locking of the swing door 7 and the vehicle body 2 is performed by the operation of opening the swing door 7 using the swing door handle 10. Specifically, as shown in FIG. 5, when the swing door handle 10 is raised in an arrow A direction, as the lock member 33 is pulled via the cable (not shown), the locking of the swing door 7 and the vehicle body 2 is released.

In the above-mentioned vehicle door structure 1, when the sliding door 6 and the swing door 7 are opened from the fully closed state of the sliding door 6 and the swing door 7, first, the sliding door 6 is slid to a rear side of the vehicle body 2 to be opened (see FIGS. 2A and 2B). Then, in this state, the swing door 7 is pivoted and opened (see FIG. 2C).

Incidentally, when the swing door 7 is closed, in order to avoid contact between the upper slide rail 13 and the guide body 14 and contact between the lower slide rail 15 and the guide body 16, before the sliding door 6 is in the fully opened state, positions of the rear end portions of the upper slide rail 13 and the lower slide rail 15 may be set such that the guide body 14 is separated from the upper slide rail 13 and the guide body 16 is separated from the lower slide rail 15. In this case, in a state in which the sliding door 6 and the swing door 7 are not locked since the sliding door 6 is not opened to the fully opened state, when the swing door handle 10 is manipulated, the sliding door 6 is supported at the swing door 7 by the intermediate slide rail 17 only. When the swing door 7 is opened in this state, the sliding door 6 may be moved with respect to the swing door 7 during pivotal movement of the swing door 7.

In addition, during the sliding of the sliding door 6, even when the swing door handle 10 is manipulated, since the guide body 14 is supported by the upper slide rail 13 and the guide body 16 is supported by the lower slide rail 15, the swing door 7 is not pivoted together with the sliding door 6. However, during the sliding of the sliding door 6, when a problem in which a state in which the release of the engagement between the lock member 33 and the striker 34 is maintained occurs, shaking of the sliding door 6 may occur when the swing door handle 10 is manipulated.

Here, in order to solve the above-mentioned problem, as shown in FIG. 5, the vehicle door structure 1 of the embodiment further includes a lock detection unit 35 and a handle disable unit 36 (a manipulation control unit). Further, in FIGS. 1 and 2, the lock detection unit 35 and the handle disable unit 36 are omitted. The lock detection unit 35 is disposed in the vicinity of the fitting section 30 of the full-opening door lock unit 25. The handle disable unit 36 is disposed in the vicinity of the swing door handle 10 positioned at the front end portion of the swing door 7.

As shown in FIG. 4, by detecting the front end side portion of the locking pin 26 being fitted into the fitting section 30, the lock detection unit 35 detects that the sliding door 6 and the swing door 7 are locked by the full-opening door lock unit 25.

The lock detection unit 35 has a lever 37 having a L-shaped cross section, pivotally (swingably) attached to the swing door 7 (not shown in FIG. 4) via a pivotal shaft 37*a* and configured to engage with the front end portion of the locking pin 26, and an disable operation switching cable 38 configured to connect the lever 37 and the handle disable unit 36. The front end portion of the locking pin 26 is engaged with one end side portion of the lever 37. The disable operation switching cable 38 is connected to the other end side portion of the lever 37, i.e., a portion of the lever 37 opposite to a portion engaged with the locking pin 26 with respect to the pivotal shaft 37*a*. In addition, the lock detection unit 35 has a lever spring 39 (a lever-biasing member) configured to bias one end side portion of the lever 37, i.e., a portion of the lever 37 engaged with the locking pin 26, toward the fitting section 30.

The lever 37 is disposed further inside (the vehicle body 2 side) than the intermediate slide rail 17 of the swing door 7. The disable operation switching cable 38 is connected to the other end side portion of the lever 37 to extend from the lever 37 toward a front side of the swing door 7 (a side at which the sliding door 6 is closed).

As shown in FIG. 4A, the lever 37 is disposed to abut the flange 30*a* of the fitting section 30 to close the opening of the fitting section 30 by the biasing force of the lever spring 39 in a state in which the lever 37 is not engaged with the locking pin 26. Accordingly, even when water outside the vehicle body 2 passes through the fitting section 30 to enter the vehicle body 2, a flow of the water is stopped by the lever 37. Further, in order to reliably block water by the lever 37, a packing may be adhered to the flange 30*a*.

As shown in FIG. 4A, in the above-mentioned lock detection unit 35, in a state in which the sliding door 6 and the swing door 7 are not locked such that the sliding door 6 is not in the fully opened state, since the front end portion of the locking pin 26 does not abut the lever 37, the lever 37 is not pressed against the locking pin 26 to pivot. When the lever 37 is not pivoted, the disable operation switching cable 38 is not pulled toward the lever 37, and it is not detected that the sliding door 6 and the swing door 7 are in the locked state.

Meanwhile, as shown in FIG. 4B, as the sliding door 6 is in the fully opened state and the front end side portion of the locking pin 26 is fitted into the fitting section 30, when the sliding door 6 and the swing door 7 are locked, since the front end portion of the locking pin 26 passes through the fitting section 30 to push the lever 37 thereinto by the biasing force of the locking pin spring 27, the lever 37 is pivoted against the biasing force of the lever spring 39 clockwise about the pivotal shaft 37*a*. Then, it is detected that the disable operation switching cable 38 is pulled toward the lever 37, and the sliding door 6 and the swing door 7 are in the locked state.

The handle disable unit 36 disables the manipulation of the swing door handle 10 when the swing door 7 is in the fully closed state. That is, when the swing door 7 is in the fully closed state, the handle disable unit 36 disables the swing door handle 10 such that the swing door 7 is not opened even though the swing door handle 10 is manipulated.

Figures 6A, 6B:
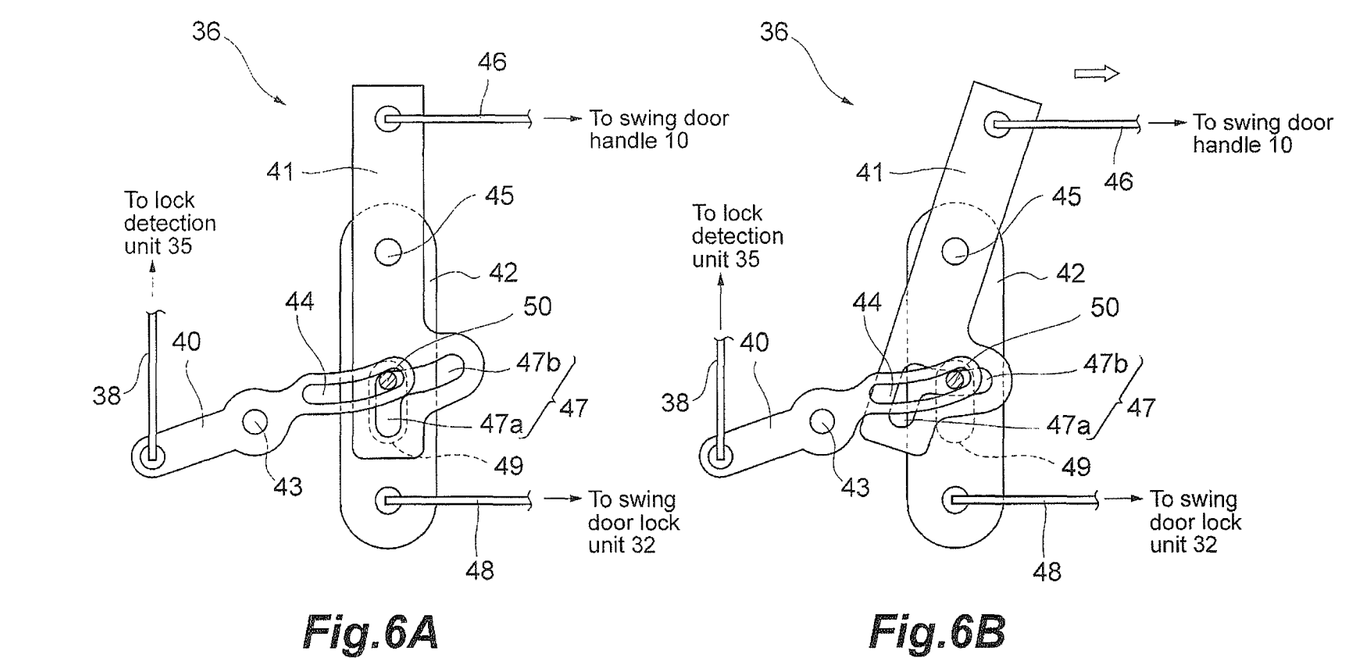
FIGS. 6A and 6B are plan view (including a partial cross-sectional view) showing the handle disable unit shown in FIG. 5.

As shown in FIG. 6, the handle disable unit 36 has three plate-shaped members 40 to 42. The plate-shaped member 40 is pivotally (swingably) attached to the swing door 7 (not shown in FIG. 6) via a shaft section 43. The above-mentioned disable operation switching cable 38 is connected to one end portion of the plate-shaped member 40. A curved guide hole 44 extending in a longitudinal direction of the plate-shaped member 40 is formed in the other end side portion of the plate-shaped member 40.

The plate-shaped member 41 is disposed to extend in a direction crossing the plate-shaped member 40. The plate-shaped member 41 is pivotally (swingably) attached to the swing door 7 (not shown in FIG. 6) via. a shaft section 45. A connecting member 46 such as a cable or the like is connected to one end portion of the plate-shaped member 41. The connecting member 46 connects the swing door handle 10 and the plate-shaped member 41. A substantially L-shaped guide hole 47 is formed in the other end side portion of the plate-shaped member 41. The guide hole 47 is constituted by a hole section 47*a* having a substantially elliptical shape and extending in the longitudinal direction of the plate-shaped member 41, and a curved hole section 47*b* extending in a direction crossing the longitudinal direction of the plate-shaped member 41.

The plate-shaped member 42 is disposed to extend in a direction crossing the plate-shaped member 40. The plate-shaped member 42 is pivotally attached to the swing door 7

(not shown in FIG. 6) via the shaft section 45. A connecting member 48 such as a cable or the like is connected to an end portion of the plate-shaped member 42 opposite to the shaft section 45. The connecting member 48 connects the lock member 33 of the swing door lock unit 32 and the plate-shaped member 42. A guide hole 49 having a substantially elliptical shape and extending in the longitudinal direction of the plate-shaped member 42 is formed in the plate-shaped member 42.

These plate-shaped members 40 to 42 are disposed to overlap each other. The plate-shaped member 41 is disposed between the plate-shaped members 40 and 42. A pin 50 passes through the guide holes 44, 47 and 49 of the plate-shaped members 40 to 42.

As shown in FIG. 4A, when the locked state between the sliding door 6 and the swing door 7 is not detected by the lock detection unit 35, the handle disable unit 36 is in a state as shown in FIG. 6A. That is, in a state in which a position of the hole section 47a of the guide hole 47 coincides with a position of the guide hole 49 and a position of an end portion of the guide hole 44 opposite to the shaft section 43 coincides with a position of an end portion of the hole section 47a of the guide hole 47 close to the shaft section 45, the guide hole 44 and the hole section 47b of the guide hole 47 extend on substantially the same line. Here, the pin 50 is disposed at a position of an end portion of the hole section 47a of the guide hole 47 close to the shaft section 45.

In such a state, when the swing door handle 10 is manipulated, as shown in FIG. 6B, the connecting member 46 is pulled and the plate-shaped member 41 is swung (pivoted) and inclined clockwise about the shaft section 45. Here, the pin 50 relatively moves (escapes) along the hole section 47b of the guide hole 47. For this reason, since the plate-shaped member 42 is not pivoted together with pivotal movement of the plate-shaped member 41, the connecting member 48 connected to the lock member 33 of the swing door lock unit 32 is not pulled. That is, even when the swing door handle 10 is manipulated, the swing door handle 10 is in a state of being overridden. Accordingly, since the locked state between the swing door 7 and the vehicle body 2 is not released by the swing door lock unit 32, the swing door 7 cannot be opened.

Figure 7A:
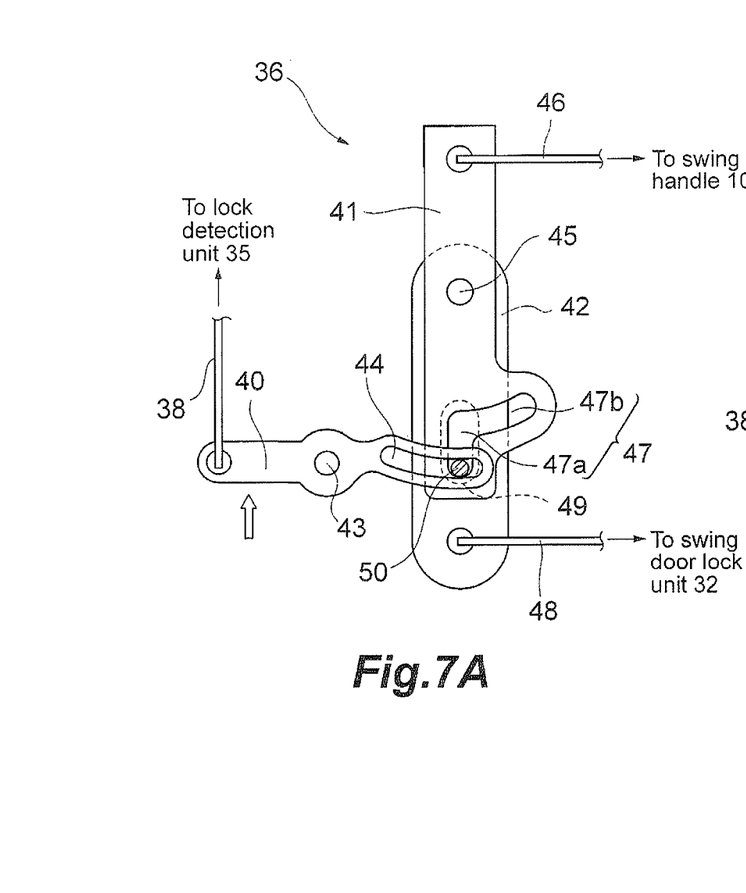
FIGS. 7A and 7B are view showing an operation state of the handle disable unit when the locked state between the sliding door and the swing door is detected by the lock detection unit shown in FIG. 4.

Meanwhile, as shown in FIG. 4B, when the locked state between the sliding door 6 and the swing door 7 is detected by the lock detection unit 35, the disable operation switching cable 38 is pulled toward the lever 37 as described above. For this reason, as shown in FIG. 7A, the plate-shaped member 40 is swung (pivoted) clockwise about the shaft section 43. Then, a position of the hole section 47a of the guide hole 47 coincides with a position of the guide hole 49 and a position of an end portion of the guide hole 44 opposite to the shaft section 43 coincides with a position of an end portion of the hole section 47a of the guide hole 47 close to the connecting member 48. Here, the pin 50 is disposed at an end portion of the hole section 47a of the guide hole 47 close to the connecting member 48.

Figure 7B:
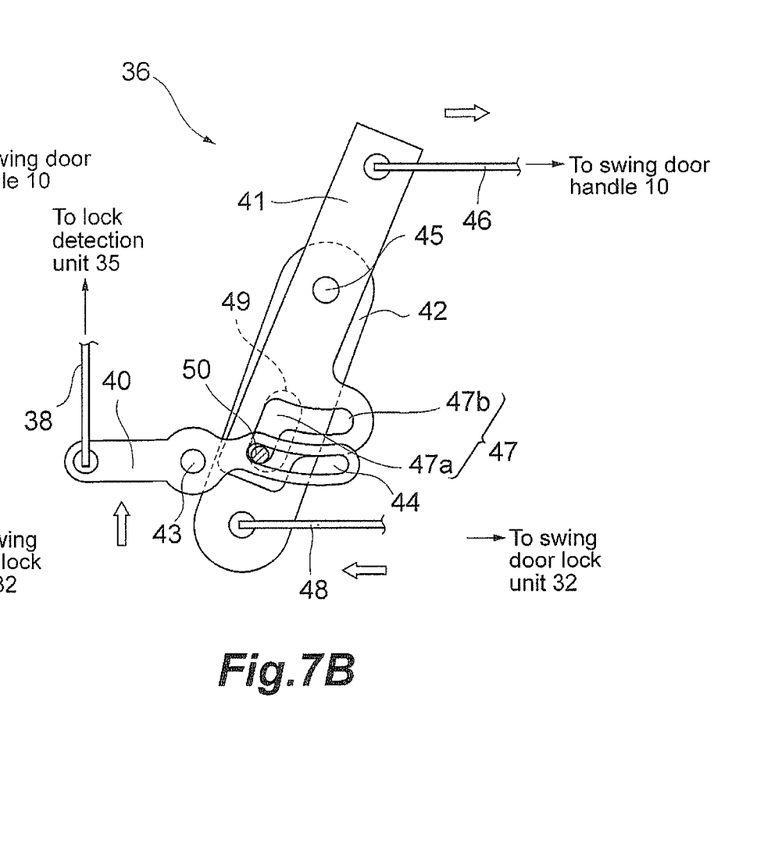

In such a state, when the swing door handle 10 is manipulated, as shown in FIG. 7B, the connecting member 46 is pulled and the plate-shaped member 41 is swung (pivoted) and inclined clockwise about the shaft section 45. Here, since the pin 50 cannot escape along the hole section 47b of the guide hole 47, the plate-shaped member 42 is also pivoted and inclined together with pivotal movement of the plate-shaped member 41, and the connecting member 48 connected to the lock member 33 of the swing door lock unit 32 is pulled. That is, the state in which the swing door handle 10 is overridden is released. Accordingly, since the locked state between the swing door 7 and the vehicle body 2 is released by the swing door lock unit 32, the swing door 7 can be opened.

As described above, when the locked state between the sliding door 6 and the swing door 7 is not detected by the lock detection unit 35, manipulation of the swing door handle 10 is overrode by the handle disable unit 36. Meanwhile, when the locked state between the sliding door 6 and the swing door 7 is detected by the lock detection unit 35, manipulation of the swing door handle 10 is enabled.

In the above-mentioned embodiment, the locking pin 26 is disposed at the guide body 18 attached to the sliding door 6; and the fitting section 30 is formed at the intermediate slide rail 17 attached to the swing door 7. When the sliding door 6 is in the fully opened state, as the locking pin 26 is biased toward the swing door 7 to be fitted into the fitting section 30 by the locking pin spring 27, the sliding door 6 and the swing door 7 are locked. Then, as it is detected by the lock detection unit 35 that the locking pin 26 is fitted into the fitting section 30, the locked state between the sliding door 6 and the swing door 7 is detected. Accordingly, for example, when the part for detection installed at the sliding door 6 pushes the lever installed at the swing door 7 thereinto, like the case in which the locked state between the sliding door 6 and the swing door 7 is detected, the locked state between the sliding door 6 and the swing door 7 can be reliably detected without performing fine position adjustment of a part such as the lever or the like.

Here, when the locked state between the sliding door 6 and the swing door 7 is not detected, since the manipulation of the swing door handle 10 is overrode by the handle disable unit 36, even when the swing door handle 10 is manipulated, the swing door 7 cannot be opened. Accordingly, the swing door 7 can be prevented from being opened in a state in which the sliding door 6 and the swing door 7 are not locked. In addition, when the locked state between the sliding door 6 and the swing door 7 is not detected, since the locked state between the swing door 7 and the vehicle body 2 is not released, the locking of the swing door 7 and the vehicle body 2 can be prevented from becoming an imperfect state. As a result, shaking of the sliding door 6 can be prevented.

In addition, when the sliding door 6 is in the fully opened state and the locking pin 26 is fitted into the fitting section 30, as the locking pin 26 presses one end side portion of the lever 37, and the locked state between the sliding door 6 and the swing door 7 is detected. Accordingly, the locked state between the sliding door 6 and the swing door 7 can be simply detected without using a sensor or the like.

In addition, when the sliding door, 6 is not in the fully opened state, i.e., in a state in which the locking pin 26 is not fitted into the fitting section 30, since the opening of the fitting section 30 is closed by the lever 37, water can be prevented from entering the vehicle body 2 through the fitting section 30.

In addition, since a shape of the lever 37 has an L-shaped cross section and the disable operation switching cable 38 is connected to the lever 37 to extend toward a front side of the swing door 7 (a side at which the sliding door 6 is closed), even when the handle disable unit 36 is disposed in i the vicinity of the front end portion of the swing door 7, there is no need to bend the disable operation switching cable 38 toward the front side of the swing door 7.

Figure 8:
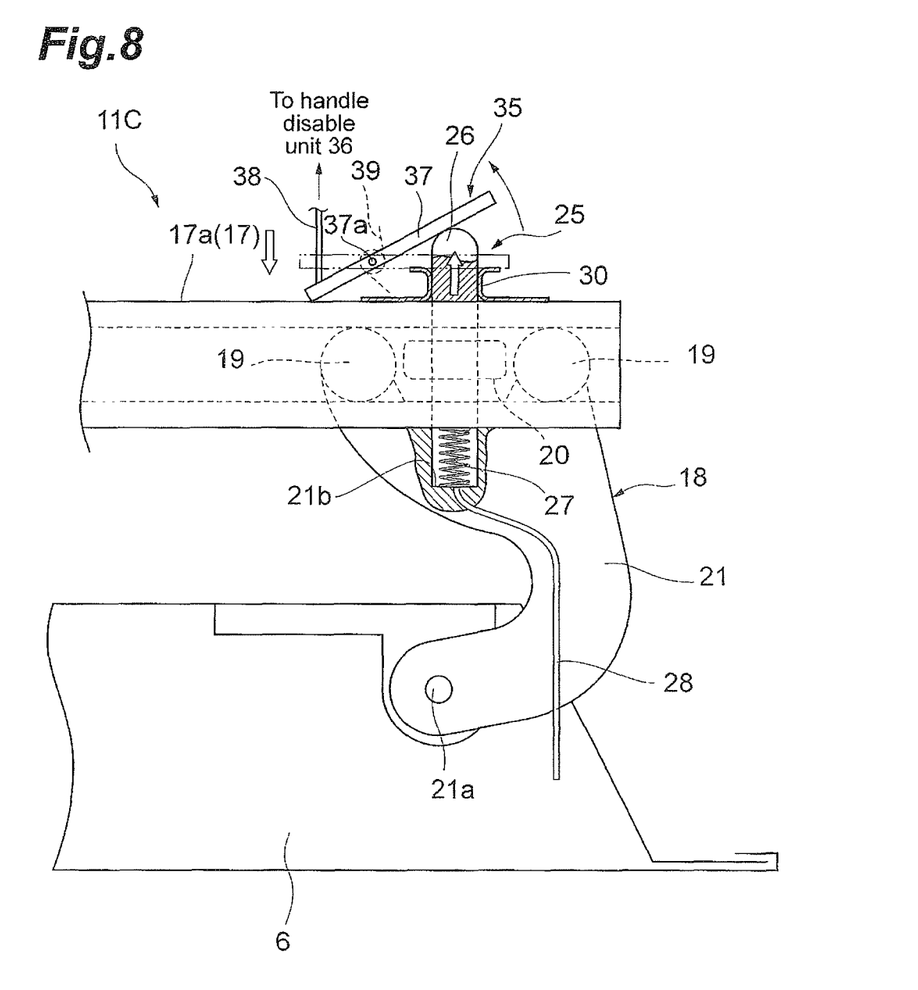
FIG. 8 is a plan view (including a partial cross-sectional view) showing a variant of the lock detection unit shown in FIG. 4 together with the one sliding door support unit and the full-opening door lock unit.

Further, the present disclosure is not limited to the embodiments. For example, in the above-mentioned embodiment, while the lever 37 engaged with the locking pin 26 has an L-shaped cross section, a shape of the lever 37 is not particularly limited, and for example, as shown in FIG. 8, the shape of the lever 37 may have a flat plate shape. In this case, a structure of the lock detection unit 35 can be simplified.

In addition, in the embodiment, while the lever 37 and the handle disable unit 36 are connected by the disable operation switching cable 38, a connecting member that connects the lever 37 and the handle disable unit 36 is not particularly limited to a cable but may be a rod or the like.

In addition, in the embodiment, as the locking pin 26 presses the lever 37, while it is detected that the locking pin 26 is fitted into the fitting section 30, a method of detecting that the locking pin 26 is fitted into the fitting section 30 is not particularly limited but, for example, may use a contact switch configured to detect a contact of the locking pin 26. In this case, even when the contact of the locking pin 26 is detected, it may be detected that the sliding door 6 and the swing door 7 are in the locked state, and the manipulation of the swing door handle 10 may be enabled by the handle disable unit 36. In the above-mentioned configuration, the fitting section need not be particularly configured to have a cylindrical shape through which the locking pin 26 passes as long as the fitting section can be fitted onto the locking pin 26.

Further, in the embodiment, while the sliding door 6 is configured to open and close the front region of the rear door opening section 4 and the swing door 7 is configured to open and close the rear region of the rear door opening section 4 together with the sliding door 6, the present disclosure can also be applied to a vehicle door structure in which the sliding door 6 is configured to open and close the rear region of the rear door opening section 4 and the swing door 7 is configured to open and close the front region of the rear door opening section 4 together with the sliding door 6. In addition, the present disclosure can also be applied to a vehicle door structure having a sliding door and a swing door that are configured to open and close a door opening section installed at a rear section of the vehicle body 2.

What is claimed is:

1. A vehicle door structure comprising a sliding door and a swing door that are configured to open and close a door opening section formed at a vehicle body, the vehicle door structure comprising:
    a sliding door support unit configured to support the sliding door to enable opening and closing thereof;
    a swing door handle configured to perform an operation of opening the swing door;
    a door lock unit configured to lock the sliding door and the swing door when the sliding door is in a fully opened state;
    a manipulation control unit configured to disable a manipulation of the swing door handle when the swing door is in a fully closed state; and
    a lock detection unit configured to detect a locked state between the sliding door and the swing door by the door lock unit,
    wherein the sliding door support unit has a slide rail attached to the swing door and configured to slide the sliding door with respect to the swing door, and a guide body attached to the sliding door and configured to guide the sliding door to the slide rail upon sliding of the sliding door,
    the door lock unit has a locking pin disposed at the guide body, a locking pin biasing member configured to bias the locking pin toward the swing door, and a fitting section formed at the slide rail and fitted onto the locking pin, and locks the sliding door and the swing door by fitting the locking pin into the fitting section,
    the lock detection unit detects the locked state between the sliding door and the swing door by detecting the locking pin being fitted into the fitting section, and
    the manipulation control unit enables a manipulation of the swing door handle when the locked state between the sliding door and the swing door is detected by the lock detection unit.

2. The vehicle door structure according to claim 1, wherein the fitting section has a cylindrical shape,
    the lock detection unit has a lever pivotally attached to the swing door via a pivotal shaft and configured to engage with a front end portion of the locking pin fitted into the fitting section, a lever-biasing member configured to bias a portion of the lever engaged with the locking pin toward the fitting section, and a connecting member configured to connect a portion of the lever opposite to the portion engaged with the locking pin with respect to the pivotal shaft and the manipulation control unit, and
    the locked state between the sliding door and the swing door is detected by pressing the lever by the locking pin.

3. The vehicle door structure according to claim 2, wherein the lever is disposed to close an opening of the fitting section by a biasing force of the lever-biasing member in a state in which the front end portion of the locking pin is not engaged with the lever.

4. The vehicle door structure according to claim 2, wherein the lever has an L-shaped cross section, and
    the connecting member is connected to the lever to extend toward a side at which the sliding door is closed.

5. The vehicle door structure according to claim 3, wherein the lever has an L-shaped cross section, and
    the connecting member is connected to the lever to extend toward a side at which the sliding door is closed.

* * * * *